United States Patent
Milella, Jr. et al.

(10) Patent No.: US 10,676,004 B2
(45) Date of Patent: Jun. 9, 2020

(54) FLOOR MAT WITH ISOLATED SUPPORT MEMBERS

(71) Applicants: Michael J. Milella, Jr., Richmond, IL (US); Karl J. Mazur, Richmond, IL (US); Robert A. Price, Glencoe, IL (US); THERMOFLEX CORPORATION, Waukegan, IL (US)

(72) Inventors: Michael J. Milella, Jr., Richmond, IL (US); Karl J. Mazur, Richmond, IL (US); Robert A. Price, Glencoe, IL (US)

(73) Assignee: THERMOFLEX CORPORATION, Waukegan, IL (US)

( * ) Notice: Subject to any disclaimer, the term of this patent is extended or adjusted under 35 U.S.C. 154(b) by 0 days.

(21) Appl. No.: 13/679,164

(22) Filed: Nov. 16, 2012

(65) Prior Publication Data

US 2013/0136899 A1 May 30, 2013

Related U.S. Application Data

(60) Provisional application No. 61/565,246, filed on Nov. 30, 2011.

(51) Int. Cl.
*B60N 3/04* (2006.01)

(52) U.S. Cl.
CPC ............. *B60N 3/048* (2013.01); *B60N 3/044* (2013.01); *Y10T 428/24612* (2015.01)

(58) Field of Classification Search
CPC .......... B60N 3/044; B60N 3/048; B60N 3/04; B60N 3/046; Y10T 428/24612
USPC .... 428/141, 172, 95, 156, 167, 169; 15/216, 15/217; 296/97.23
See application file for complete search history.

(56) References Cited

U.S. PATENT DOCUMENTS

| | | | | |
|---|---|---|---|---|
| 2,275,575 | A * | 3/1942 | Vrooman | 428/167 |
| 4,491,556 | A * | 1/1985 | Fujii et al. | 264/243 |
| 5,154,961 | A * | 10/1992 | Reuben | A43B 3/0078 15/215 |
| 6,933,036 | B2 * | 8/2005 | Whitaker | B60N 3/046 15/215 |
| 2011/0076457 | A1 * | 3/2011 | Reichwein et al. | 428/172 |
| 2012/0324805 | A1 * | 12/2012 | Reichwein et al. | 52/127.1 |

FOREIGN PATENT DOCUMENTS

| | | | |
|---|---|---|---|
| GB | 2171902 A | 9/1986 | |
| GB | 2171902 B * | 9/1986 | ............. A47G 27/02 |
| JP | S 63-64841 A | 3/1988 | |
| JP | H 09-175248 A | 7/1997 | |

OTHER PUBLICATIONS

Japanese Office Action from Corresponding Japanese Patent Application No. 2012-262200, dated May 24, 2016.

* cited by examiner

*Primary Examiner* — Brian Handville
(74) *Attorney, Agent, or Firm* — Greer, Burns & Crain, Ltd.

(57) ABSTRACT

A floor mat is provided, including a mat body having an upper surface, and a heel pad disposed on the upper surface with a heel pad upper surface and an underside from which depend a plurality of isolated support members projecting generally perpendicularly from the underside such that the heel pad provides compressive strength and enhanced flexibility.

9 Claims, 7 Drawing Sheets

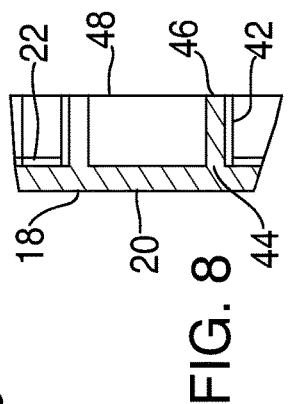
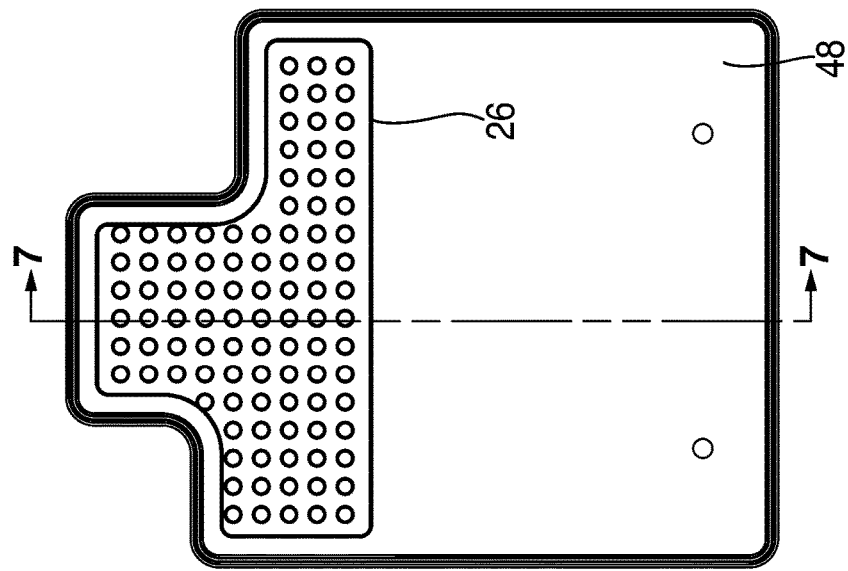
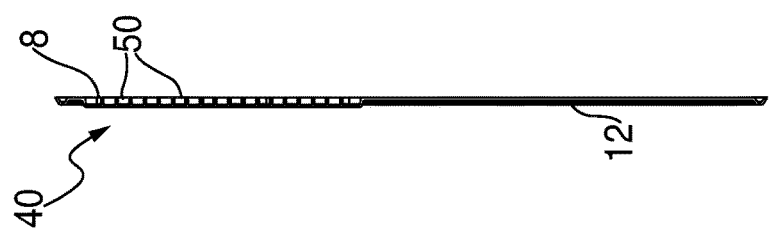
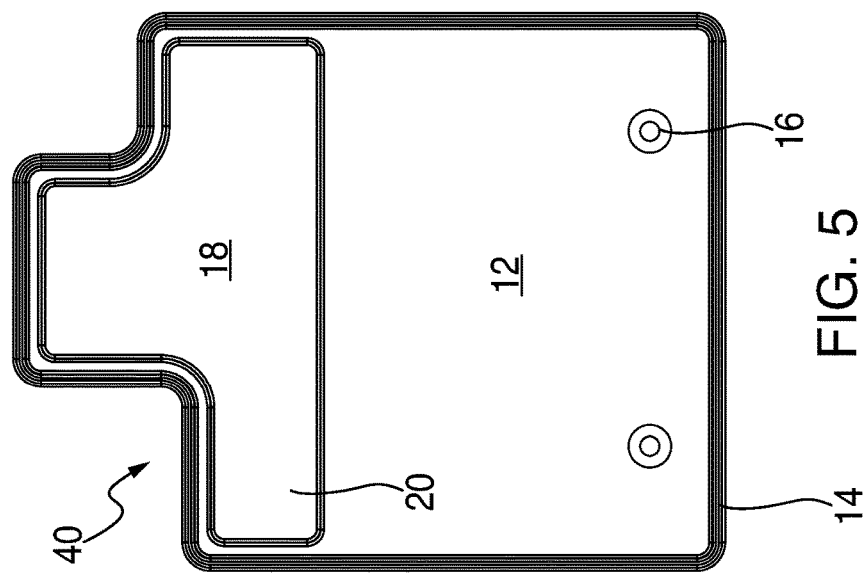

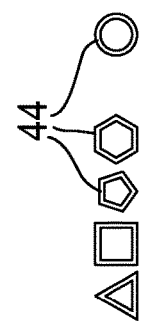
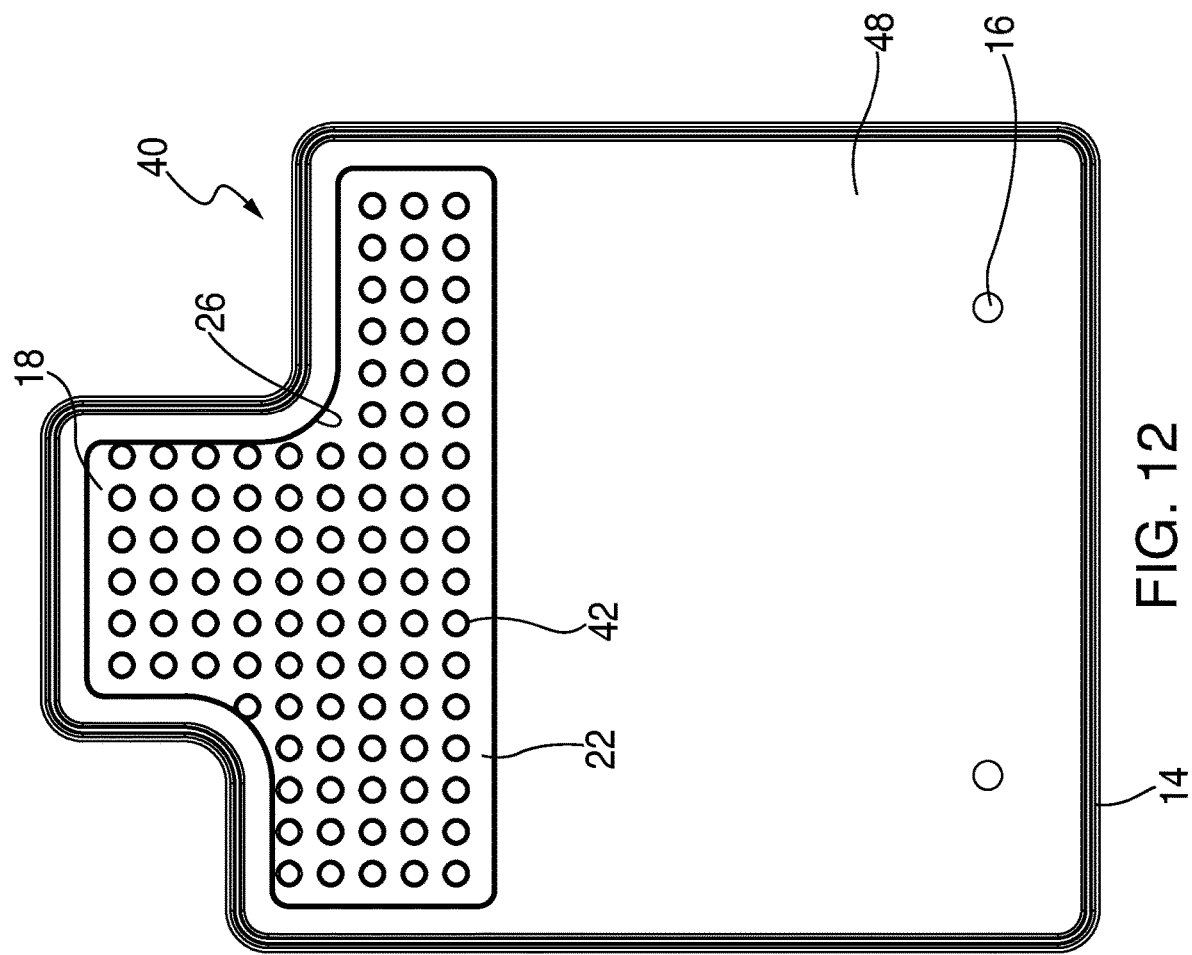

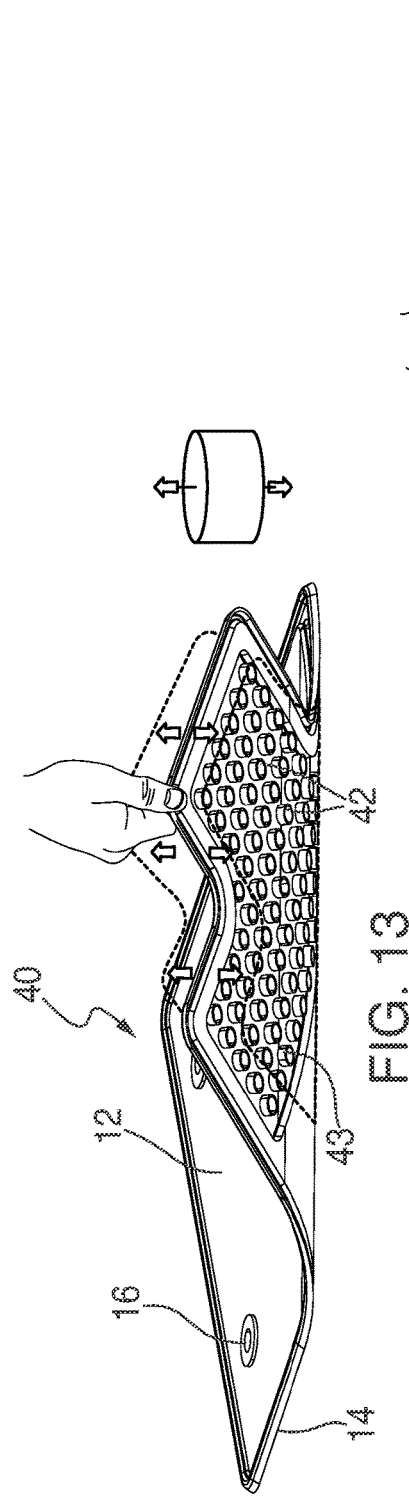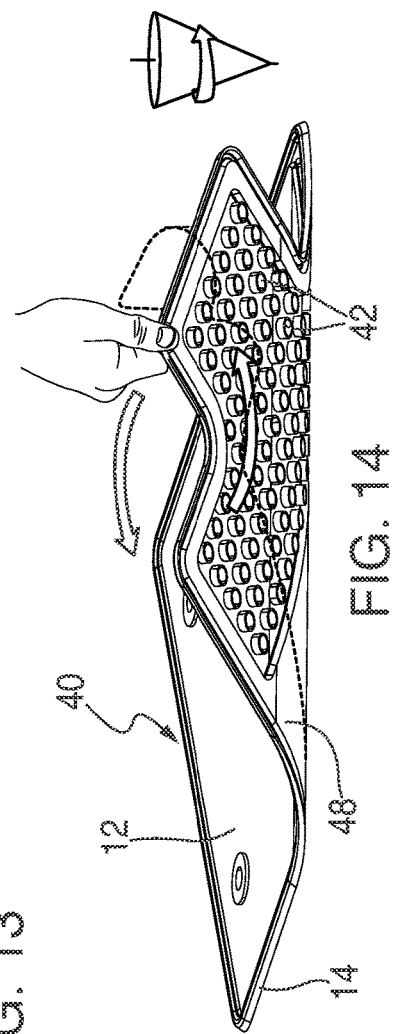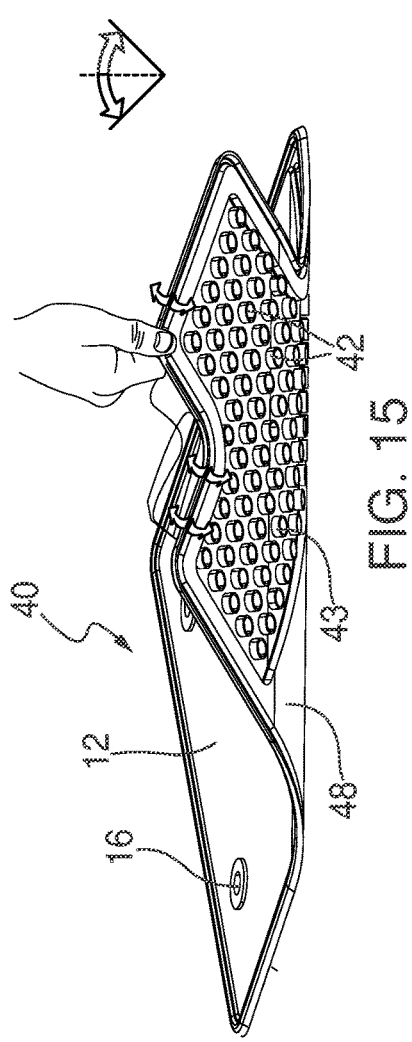

FLOOR MAT WITH ISOLATED SUPPORT MEMBERS

RELATED APPLICATION

This application claims priority pursuant to 35 USC 119 (e) from U.S. Provisional Application Ser. No. 61/565,246 filed Nov. 30, 2011.

BACKGROUND

The present invention relates generally flexible protective mats designed for use on floors, and more specifically to such mats used in motor vehicles for protecting carpeting.

Conventional automotive floor mats are commonly used for protecting carpeting from becoming soiled from dirt, road salt, water and the like. n addition, conventional automotive mats specially configured for use on the driver's side of the vehicle, include heel pads designed to support the driver's foot used for operating the accelerator pedal. Such heel pads include a wear-resistant upper surface, and a supporting grid beneath the upper surface. It is common in such mats that the upper surface is made of thicker material and is maintained slightly above the surrounding upper surface of the mat, even while accommodating the weight of the driver's foot. The same holds true whether or not the surrounding mat is carpeted. In creating the heel pad, the mat is formed with a cavity beneath the pad, which is usually occupied by the conventional supporting grid. The supporting grid is constructed and arranged for bearing the weight of the user's foot while driving, and as such is typically made of interlocking ribs of plastic forming a checkerboard pattern. Since conventional automotive floor mats are made by injection molding, the heel pad and the supporting grid are integrally formed with the mat during this process. As such, the supporting grid is constructed and arranged for being easily created by flowing molten plastic injected under pressure.

Also, since the foot is typically inclined while operating the accelerator pedal, the weight of the driver's foot is often applied to the heel pad in a concentrated zone close to and including the driver's heel. As such, the supporting grid is designed for accommodating this concentrated application of force, including that applied when the driver's are relatively heavy, and/or when wearing pointed-heeled shoes.

One drawback of conventional mats is that the heel pads, designed for addressing the range of forces described above, are relatively rigid or inflexible compared to the surrounding mat material. There is a desire within the industry for floor mats having increased flexibility across the full surface of the mat.

SUMMARY

The above-identified need is met by the present floor mat with isolated support members in the area of the heel pad. Using the present support members, the heel pad is provided with at least the same amount of support provided by conventional support grids, while providing relatively greater flexibility, so that the flexibility of the heel pad is comparable to that of the surrounding mat material. The flexibility of the present heel pad is sufficient to allow the mat to bend backward upon itself in the region of the heel pad. In addition, the present heel pad region of the present mat is flexible in multiple directions, which facilitates handling and manipulation of the mat during installation and removal. In contrast to conventional mats with heel pads, the lack of interlocking, connected support cross-members facilitates the resulting flexibility. At the same time, the present heel pad has comparable compressive strength to the conventional designs while requiring less plastic material. Another advantage of the increased flexibility of the present heel pad is that the mat conforms more closely to the vehicle firewall than conventional mats, where the relatively rigid heel pad is positioned near the accelerator pedal, closely adjacent the firewall in most vehicles.

Provided in a variety of horizontal cross-sectional shapes, including circular, ovoid, triangular, square, pentagonal, hexagonal or other polygonal shapes, the present support members are spaced in a pattern beneath the upper heel pad surface. The preferred pattern features the individual support members isolated from each other and arranged in organized rows and columns when viewed from above. In a particularly preferred pattern, the individual isolated support members are positioned at the former intersection points of the prior art support grids.

More specifically, a floor mat is provided, including a mat body having an upper surface, and a heel pad disposed on the upper surface with a heel pad upper surface and an underside from which depend a plurality of isolated support members projecting generally perpendicularly from the underside such that the heel pad provides compressive strength and enhanced flexibility.

In another embodiment, a floor mat is provided, including a mat body having an upper surface, a heel pad disposed on the upper surface with a heel pad upper surface and an underside from which depend a plurality of isolated support members projecting generally perpendicularly from the underside such that the heel pad provides compressive strength and enhanced flexibility. The heel pad underside includes a cavity defined by a peripheral wall, and the support members are spaced from the peripheral wall. The support members each have a thickness which is preferably ⅔ a thickness of the mat body.

BRIEF DESCRIPTION OF THE DRAWINGS

FIG. 5 is a top plan view of the present automotive floor mat;

FIG. 6 is a bottom plan view of the mat of FIG. 5;

FIG. 7 is a vertical cross-section taken along the lines 7-7 of FIG. 6 and in the direction indicated generally;

FIG. 8 is an enlarged fragmentary section from FIG. 7;

FIG. 12 is an enlarged bottom plan view of the mat of FIG. 5;

FIG. 12A is a variety of the alternate contemplated shapes for the isolated support members;

FIG. 13 is a perspective view of the present automotive floor mat being flexed in a first direction;

FIG. 14 is a perspective view of the present automotive floor mat being flexed in a second direction; and FIG. 15 is a perspective view of the present automotive floor mat being flexed in a third direction.

DETAILED DESCRIPTION

Figure 2:
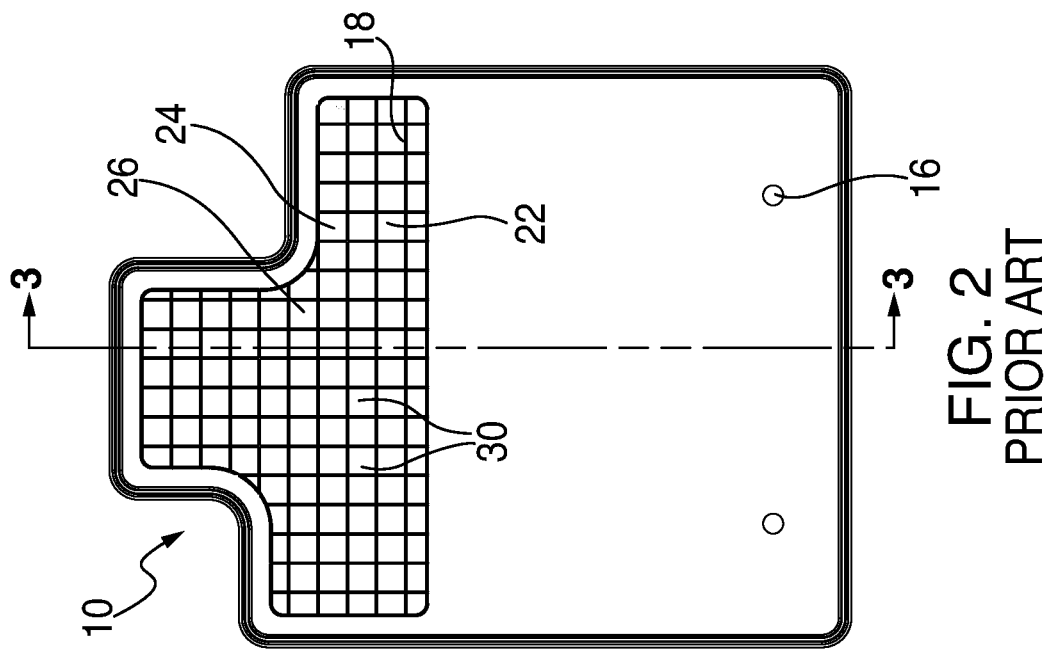
FIG. 2 is a bottom plan view of the mat of FIG. 1.
Figure 3:
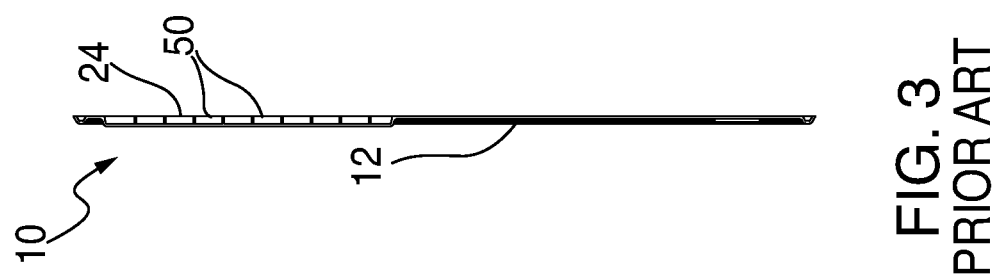
FIG. 3 is a vertical cross-section taken along the line 3-3 of FIG. 2 and in the direction generally indicated.
Figure 1:
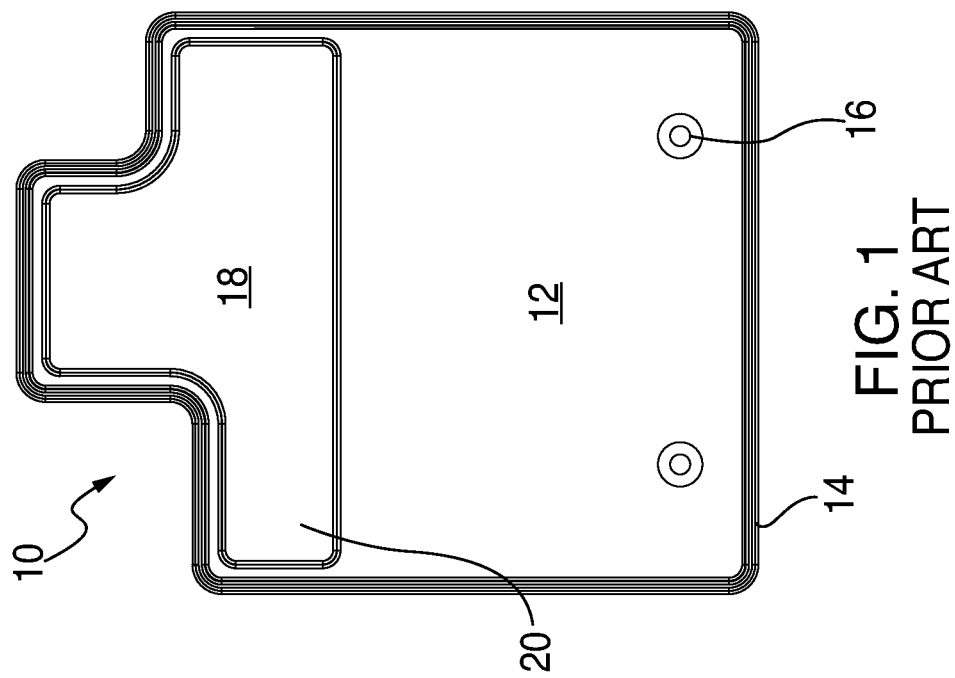
FIG. 1 is a top plan view of a prior art automotive floor mat.
Figure 4:
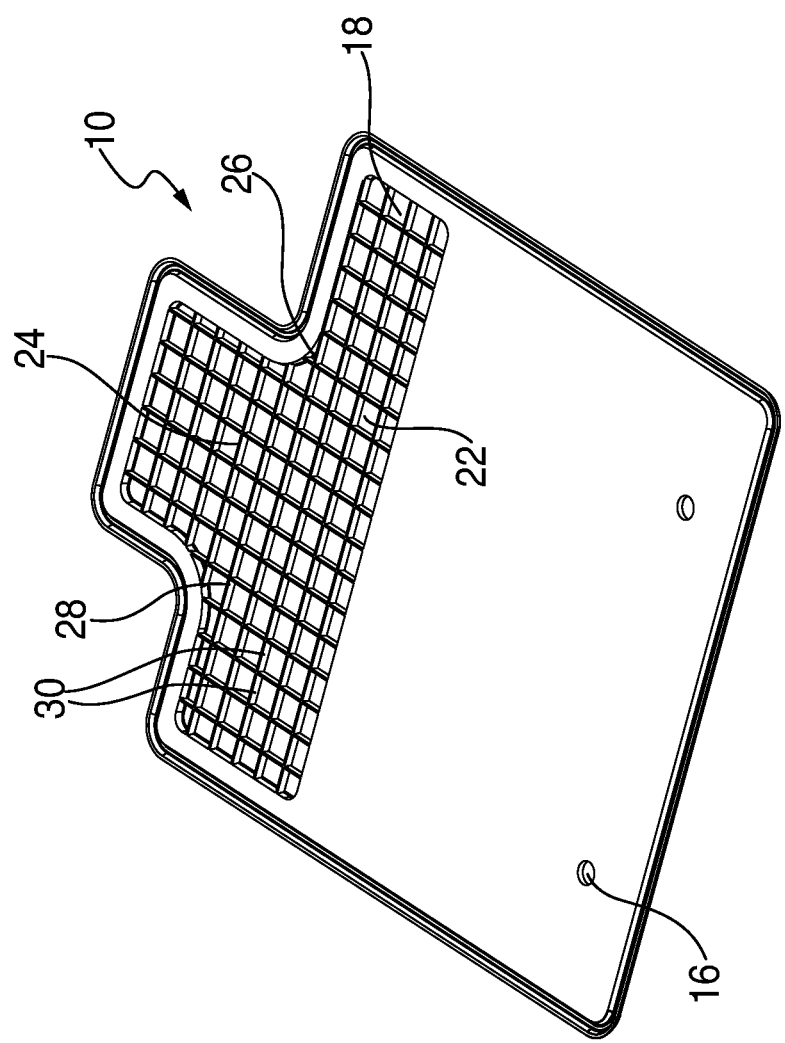
FIG. 4 is a top perspective view of the mat of FIG. 1.
Figure 9:
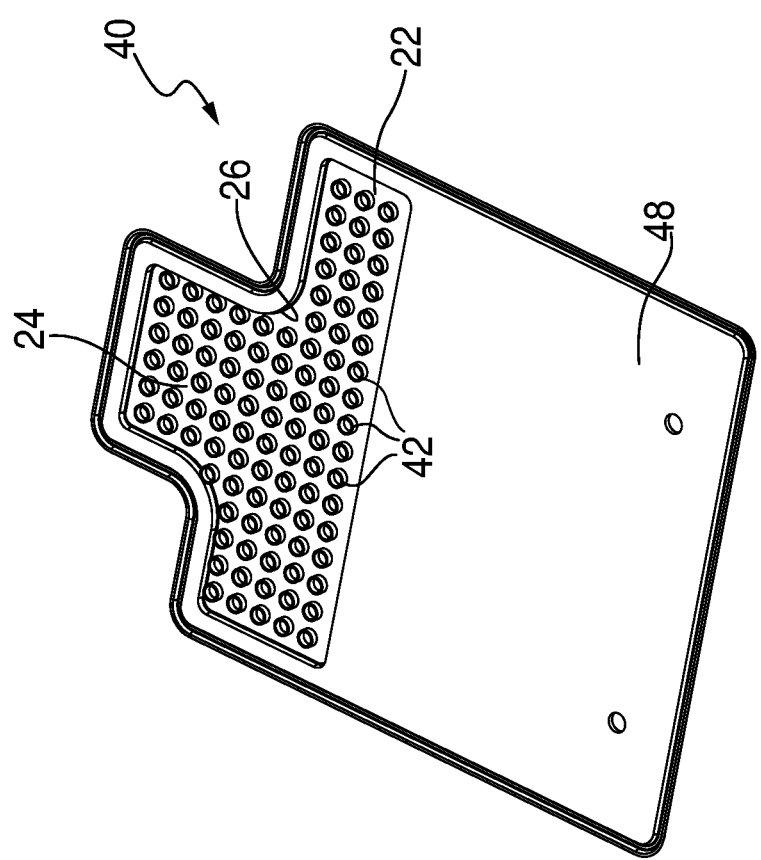
FIG. 9 is a bottom perspective view of the mat of FIG. 5.

Referring to FIGS. 1-4, a prior art floor mat is shown and generally designated 10, particularly designed for use as an automotive floor mat. However, it is contemplated that the present invention is suitable for use with other types of flexible floor-protecting mats used in residences, businesses, public buildings or the like. The mat 10 is preferably injection molded, however other fabrication techniques are contemplated. The material used to make the mat 10 is thermoplastic elastomer (TPE), as is known in the art.

More specifically, the prior art mat 10 includes a mat body 11 having an upper surface 12 defining a peripheral edge 14. At least one optional grommet 16 is provided for more positively securing the mat 10 to a vehicle floor (not shown). As is known in the art, the upper surface 12 is optionally carpeted, but otherwise has a wear surface integral with the rest of the mat. A portion of the upper surface 12 is formed into a heel pad 18, especially in the case of mats 10 designed for use on the driver side of vehicles.

The heel pad 18 includes a heel pad top 20 and an opposite heel pad underside 22 having a cavity 24 defined by a perimeter wall 26. A supporting grid 28 is integrally formed from and depends from the heel pad underside 22. A plurality of ribs 30 forms the supporting grid 28 through arrangement in a checkerboard pattern.

As described above, it has been found that an unintended side effect of strengthening the conventional heel pads so that operational vertical or 'z'-axis force loads are suitably supported has been a marked reduction in flexibility in the heel pad area. This reduction in flexibility, among other things, makes the mat 10 more cumbersome to manipulate during installation and removal, and also more difficult to fit to conform to the vehicle firewall.

The conventional supporting grid 28 requires a minimum wall thickness of the ribs 30 to facilitate the flow of molten plastic during the injection molding process. Attempts to increase flexibility by reducing the wall thickness cause the moldability of the product to be reduced to the point where the resulting part will be commercially unsuitable. Also, at some point, the walls are too thin to properly support the heel pad. Alternatively, if regions of the conventional supporting grid 28 are thickened, that particular area will require a longer time for the molten plastic to cool, resulting in an uneven appearance with unwanted dimpling and/or shrinkage.

Referring now to FIGS. 5-9 and 12A, the present mat is generally designated 40. Components shared with the prior art mat 10 are designated with the identical reference numbers. A main difference between the mats 10 and 40 is that, instead of the supporting grid 28, the present mat 40 is provided with a plurality of isolated, depending support members 42 on a corresponding heel pad 43.

The present support members 42 are hollow and preferably cylindrical or circular in horizontal cross-section, but it is contemplated that other shapes are also suitable, including but not limited to oval, triangular, square, pentagonal, hexagonal and other configurations of polygonal shapes, both regular and irregular (FIG. 12A). The particular geometric shape of the support members 42 is far less important than the fact that they are isolated from each other, and independently project from the heel pad underside 22 in a direction perpendicular to a plane defined by the present heel pad 43.

Each of the present support members 42 is integrally formed with the surrounding heel pad 43, and is secured to the underside 22 of the heel pad at an upper end 44. Opposite the upper end 44, a lower end 46 extends to a point even with a lower edge 48 of the mat 40.

In the preferred embodiment, the support members 42 are distributed about the heel pad underside 22 that approximates the intersection points of the ribs 30 in the conventional supporting grid 28. As is seen, the support members 42 are distributed in columns and rows. It is preferred that the present support members 42 do not contact an adjacent perimeter wall 26 of the heel pad 43, however even if one of the support members does touch the wall, other portions of the heel pad will not be affected.

It has been found that the wall thickness of the ribs 30, as well as that of the support members 42 is preferably ⅔ a thickness "T" (FIG. 10) of the body 11 of the mat 10, 40 being supported. In other words, the wall thickness is preferably in the range of 0.060 to 0.090 inch.

Figure 10:
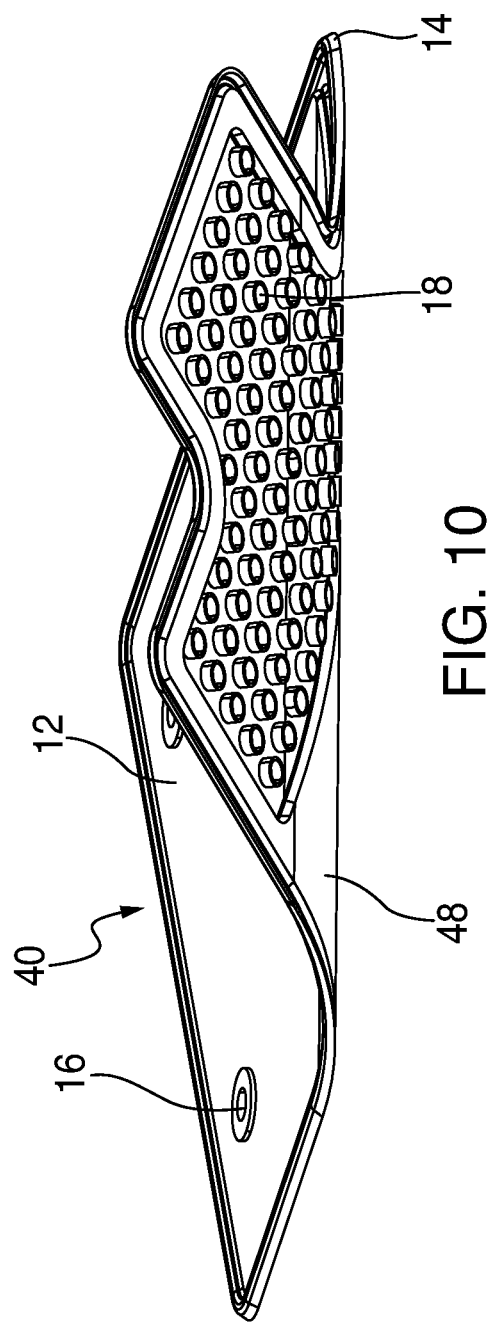
FIG. 10 is a perspective elevation of the mat of FIG. 5 in a partially flexed position.
Figure 11:
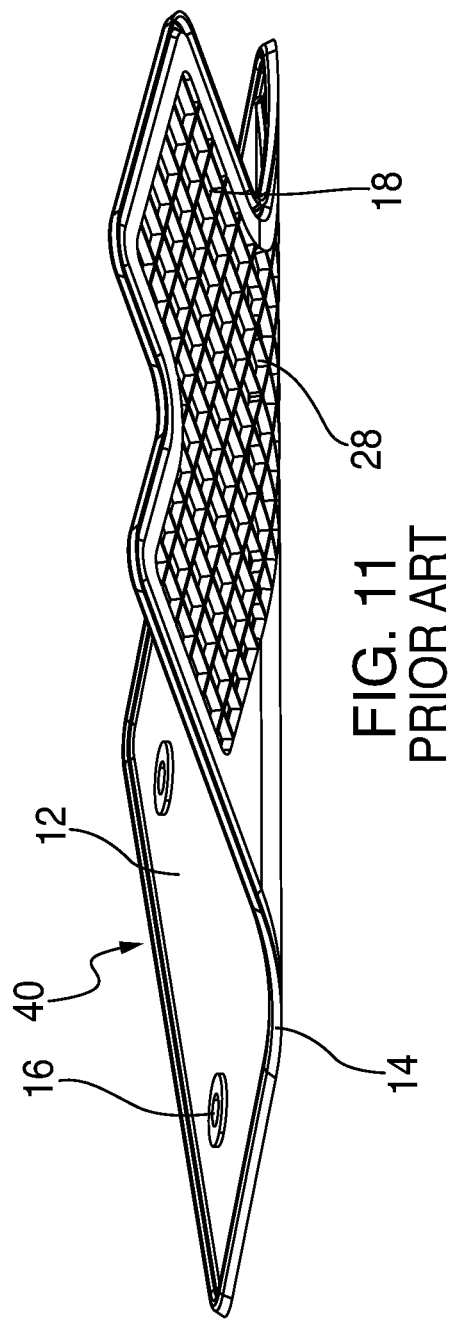
FIG. 11 is a perspective elevation of the prior art mat of FIG. 1 in a partially flexed position.

Referring now to FIGS. 10 and 11, an advantage of the present heel pad construction in the mat 40 is providing 'z'-axis strength equivalent to conventional support grids, while providing enhanced flexibility that is comparable to that of the surrounding mat. It will be seen from FIGS. 10 and 11, as well as in FIGS. 13-15 discussed below that the heel pad 18 in the present mat 40 is more flexible than the prior art mat 10. Furthermore, in contrast to the conventional mat 10, the heel pad 43 in the mat 40 is sufficiently flexible that it can be bent back upon itself, and is flexible in multiple planes simultaneously. In other words, the heel pad 43 in the present mat 40 is flexible in multiple degrees of freedom compared to the conventional heel pad 18.

The spacing of the support members 42 in the present mat 40 is approximately 1 inch×1 inch, however other spacings are contemplated, including 2 inch×2 inch. When selecting the diameter of the support members 42, the smaller the diameter, the more flexible will be the mat. Alternately, as the diameter increases, the support member 42 will eventually contact adjacent support members and reduce flexibility, which is to be avoided. A preferred diameter, measured from respective center axes, is approximately ½ the spacing between adjacent support members.

Comparing FIGS. 3 to FIG. 7, it will be seen that there are twice as many support elements 50 in cross-section, referring to separate, perpendicularly extending support structures, in the present mat 40 than in the prior art mat 10. It has been found that the present arrangement of the support members 42 provides greater strength in the 'z'-axis than the conventional supporting grid arrangement described in relation to FIGS. 1-4.

Referring now to FIGS. 13-15, it will be seen that the present automotive floor mat 40 is very flexible in the area of the heel pad 43 compared to the conventional mat 10. Each depiction in FIGS. 13-15 of the mat 40 being flexed is accompanied by an icon illustrating the plane of movement. More specifically, the mat 40 is flexible or bendable upward, in a vertical direction transverse to a plane defined by the mat 40 (FIG. 13); is also bendable in a twisting motion, or about a vertical axis transverse to the plane of the mat (FIG. 14); and is also flexible and bendable in a motion that will upturn the peripheral edge 14 (FIG. 15) in a lateral motion.

While a particular embodiment of the present floor mat with isolated support members has been shown and described, it will be appreciated by those skilled in the art that changes and modifications may be made thereto without departing from the invention in its broader aspects and as set forth in the following claims.

What is claimed:

1. A floor mat comprising:
a mat body having a front end, a rear end, an upper surface, a lower surface and a peripheral edge extending along the entire perimeter of said mat body, said peripheral edge having an inner surface extending from said upper surface, an outer surface and a bottom surface extending between said inner surface and said outer surface, said lower surface at said rear end including a substantially flat portion;
a heel pad disposed on said front end of said mat body and having a perimeter wall extending along the entire perimeter of the heel pad, said heel pad including an upper surface and an underside having a lower edge even with said lower surface, said heel pad including a recessed area extending inwardly from said lower edge and defining a z-axis extending from said upper surface toward said underside of said heel pad, wherein the entire perimeter wall of said heel pad is spaced from said inner surface of said peripheral edge of said mat body and a portion of said lower surface of said mat body extends between said perimeter wall of said heel pad and said inner surface of said peripheral edge of said mat body, said lower surface between said perimeter wall and said peripheral edge being substantially flush with said bottom surface of said peripheral edge and said lower surface at said rear end of said mat body;
a plurality of isolated support members extending from said underside of said heel pad to a point even with said lower edge and said lower surface, said support members projecting generally perpendicularly from said underside such that said heel pad provides compressive strength along said z-axis and enhanced flexibility, said support members being spaced from each other and each independently projecting from said heel pad so as to be contact-free of adjacent support members, said support members each being spaced from said perimeter wall and each including an upper end attached to said underside of said heel pad, and an opposing lower end, each of said support members being hollow and open at said lower end opposite said mat body, and each of said support members having a wall with a flat outer surface that extends an entire length of said support members to a point even with said lower edge and said lower surface and said wall having a flat bottom surface at said lower end; and
said isolated support members are arranged in a grid pattern, wherein said grid pattern is not offset.

2. The floor mat of claim 1 wherein said support members are arranged in columns and rows in spaced relationship to each other.

3. The floor mat of claim 1 wherein said support members are each provided in a horizontal cross-sectional shape taken from the group including circular, oval, triangular, square, pentagonal, hexagonal and polygonal.

4. The floor mat of claim 1 wherein said support members have a diameter generally equal to half of the distance between adjacent support members.

5. The floor mat of claim 1 wherein said heel pad is sufficiently flexible that it can be bent back upon itself and is flexible in multiple planes simultaneously.

6. The floor mat of claim 1 wherein said support members each have a thickness which is two-thirds of a thickness of the mat body.

7. The floor mat of claim 6 wherein said thickness is in the range of 0.060 to 0.090 inch.

8. A floor mat, comprising:
a mat body having a front end, a rear end, an upper surface, a lower surface and a peripheral edge extending along the entire perimeter of said mat body, said peripheral edge having an inner surface extending from said upper surface, an outer surface and a bottom surface extending between said inner surface and said outer surface, said lower surface at said rear end including a substantially flat portion;
a heel pad disposed on said front end of said mat body and having a perimeter wall extending along the entire perimeter of said heel pad, said heel pad including an upper surface and an underside having a lower edge even with said lower surface, said heel pad including a recessed area extending inwardly from said lower edge and defining a z-axis extending from said upper surface toward said underside of said heel pad, wherein the entire perimeter wall of said heel pad is spaced from said inner surface of said peripheral edge of said mat body and a portion of said lower surface of said mat body extends between said perimeter wall of said heel pad and said inner surface of said peripheral edge of said mat body, said lower surface between said perimeter wall and said peripheral edge being substantially flush with said lower surface at said bottom surface of said peripheral edge and said lower surface at said rear end of said mat body;
a plurality of isolated support members extending from said underside of said heel pad to a point even with said lower edge and said lower surface, each of said isolated support members including a wall projecting independently and generally perpendicularly from said underside such that said heel pad provides compressive strength along said z-axis and enhanced flexibility, said wall of each of said isolated support members having a flat outer surface extending an entire length of said isolated support members, wherein said wall has a bottom surface that is flat;
said isolated support members are arranged in a grid pattern, wherein said grid pattern is not offset;
said heel pad underside includes a cavity defined by said perimeter wall, and each of said support members are spaced from said perimeter wall;
said walls of said support members each defining a hollow interior and each are open at an end opposite said mat body and each have a thickness which is two-thirds of a thickness of the mat body; and
said heel pad is sufficiently flexible that it can be bent back upon itself and is flexible in multiple planes simultaneously.

9. The floor mat of claim 8 wherein said support members are each provided in a horizontal cross-sectional shape taken from the group including circular, oval, triangular, square, pentagonal, hexagonal and polygonal.

* * * * *